March 14, 1950     A. B. CLUNAN     2,500,484
REINFORCED EDGE TRANSPARENT WALL
CONTAINER AND BLANK THEREFOR
Filed April 29, 1946

INVENTOR:
ALBERT B. CLUNAN
BY R.H. Waters
ATTORNEYS.

Patented Mar. 14, 1950

2,500,484

UNITED STATES PATENT OFFICE 2,500,484

REINFORCED EDGE TRANSPARENT WALL CONTAINER AND BLANK THEREFOR

Albert B. Clunan, Akron, Ohio, assignor to Wingfoot Corporation, Akron, Ohio, a corporation of Delaware Application April 29, 1946, Serial No. 665,869

2 Claims. (Cl. 206—45.34)

The present invention relates to a container that will stand by itself, which is formed from a single sheet of reinforced film. The film is transparent and is usually preferably moisture resistant. The container may be used for packaging flowers, powder puffs, etc. The invention includes the container and the reinforced film from which it is made.

The container of the present invention is comprised of film so stiffened with reinforcing strips as to provide a composite structure that can be readily formed into a self-supporting container. Two strips of cardboard or other stiffening material are fastened to the film in parallel spaced relationship prior to forming the package; and when the package is formed, one of these strips is at or near the top edge of the package, and the other is at or near the bottom edge of the package. The strips stiffen the package and cause it to hold its shape with minimum obstruction to a clear view of its contents.

The container of the present invention can be produced continuously from rolled stock, reinforced with continuous reinforcing strips.

Figure 1:
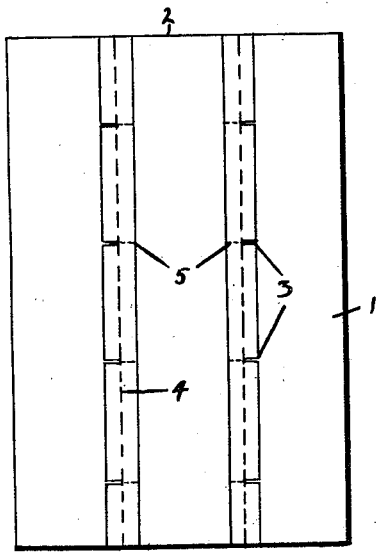
Figure 2:
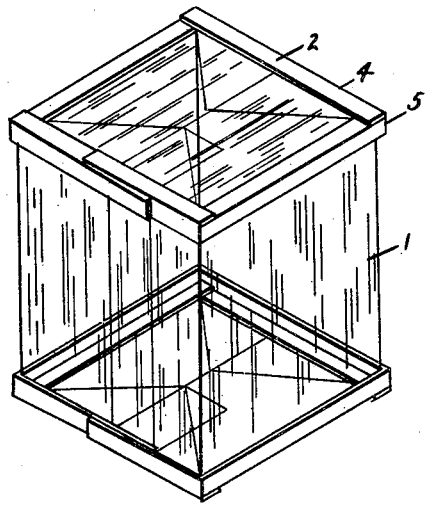
Figure 3:
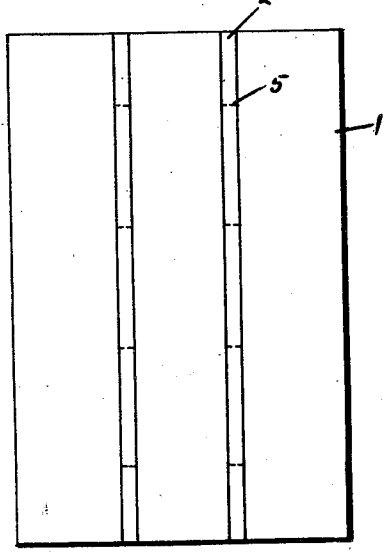

The invention will be further explained with reference to the accompanying drawings in which two modifications are shown, Figs. 1 and 2 showing one modification and Figs. 3 and 4 the other. Figs. 1 and 3 show flat sheets of the film with the reinforcement strips attached, and Figs. 2 and 4 show the assembled containers.

In the drawings 1 is a sheet of film, 2 the reinforcing strips. The film is preferably a moisture-proof film, such as rubber hydrochloride film or the like. Rubber hydrochloride film about .001 inch thick is quite satisfactory. The reinforcing strips are cut and preferably notched at 3 to permit bending and folding, as shown in Fig. 2. These strips are scored along the dotted lines 4 and 5. When the sheet assembly is folded into a container, these folds produce the edges 4 and 5 (Fig. 2). The ends of the strips 2 may be slit and interlocked as shown in Fig. 2. The ends of the film are folded down, producing the top and bottom of the container. Any suitable adhesive may be used to bind the folded film and interlocked reinforcing strips. If rubber hydrochloride film is used, the overlapping portions may be heat-sealed to one another.

Figure 4:
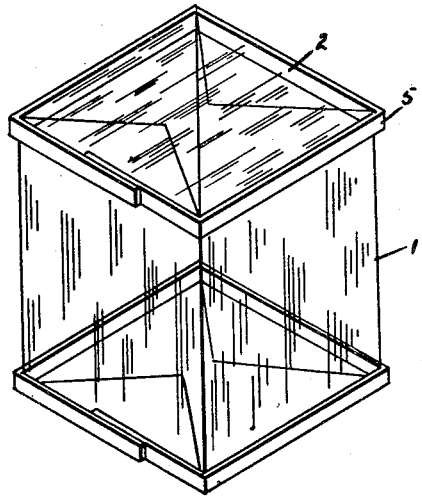

The second modification shown in Figs. 3 and 4 provides a somewhat similar, but less rigid, construction. The reinforcing strips are scored only. The scores are made along the dotted lines 5 (Fig. 3). Thus, no angular reinforcing strips are provided. The ends of the strips 2 are overlapped, and the ends of the film are folded down as in the first modification.

It is appreciated that Figs. 1 and 3 show only a portion of a continuous strip of film reinforced with continuous reinforcing strips. Portions of a strip are cut of suitable length to form individual containers. The continuous uncut strips may be advantageously rolled for storage and transportation.

The films with reinforcing strips attached may be shipped flat to the user. He will then form the container around the flowers or other article to be wrapped. If preferred, the containers may be shipped as partially completed boxes, with the film at one end projecting outwardly. The container may be completely formed before shipment but with the film at one end unsealed.

Although rubber hydrochloride is the preferred film material for this use, other films which are not stiff enough to stand by themselves may be used, such as those composed of vinyl plastics, regenerated cellulose, etc. The thickness of the film may vary, and films of different thickness will be used for packages of different sizes to give the support required. Rubber hydrochloride film which is .0008 to .0012 inch thick, or somewhat more or less, and which is unplasticized or contains up to 10 or more per cent of plasticizer will generally be satisfactory. Other flexible films are more limp or are stiffer than rubber hydrochloride, and somewhat different thicknesses of such films will be required to give an equivalent film. For very small or very large packages, films of different stiffness are preferred. Thus, it is difficult to state the stiffness of film required or the thickness of film which will give the preferred or required stiffness. In general, it may be said that film of the thickness of the order of .001 inch is satisfactory.

It is not intended that cellulose acetate (such as is used for transparent hat boxes) or Celluloid or other stiff films be used in manufacturing the containers of this invention. It is intended that the film used be so flexible that a larger flat sheet thereof (e. g., a sheet of the size required for the manufacture of the container) if placed erect on one edge will not stand by itself.

Small packages may be less than an inch in each direction. A package about 2 inches in each direction is shown in the drawings. The package may measure several inches in each direction to comfortably accommodate an orchid, for instance. The thin films used are not suited to the manufacture of large packages because of the

What I claim is:

1. A rectilinear container that will stand by itself which is composed of a single sheet of transparent film of a thickness of the order of .001 inch, so flexible that a large flat sheet stood erect on one edge thereof will not stand by itself, reinforced along the top and bottom edges by parallel, narrow cardboard strips fastened thereto which are notched and folded at the four corners and along a line running longitudinally thereof, producing reinforcing members of angular cross section which give said reinforcement at the top and bottom edges, the top and bottom of the container being folded from film which extends beyond the respective reinforcing strips, all six faces of the rectilinear container being transparent except for said narrow reinforcing strips.

2. A rectangular sheet of transparent film of a thickness of the order of about .001 inch, so flexible that a large flat sheet stood erect on one edge thereof will not stand by itself, with two parallel, narrow reinforcing strips running the length thereof affixed thereto, equally spaced from the edges of the film and parallel thereto, and spaced farther from each other than from the respective edges of the film, each strip being identically scored at four places and cut at each scoring a short distance from the outer edge of the strip, and also scored longitudinally to facilitate folding into a rectilinear container all sides of which are entirely transparent except for the reinforcing strips folded over the edges of the top and the bottom of the container.

ALBERT B. CLUNAN.

REFERENCES CITED

The following references are of record in the file of this patent:

UNITED STATES PATENTS

| Number | Name | Date |
|---|---|---|
| 1,160,760 | Rexford | Nov. 16, 1915 |
| 2,008,167 | Bergstein | July 16, 1935 |
| 2,009,511 | Nydegger | July 30, 1935 |
| 2,143,957 | Petter | Jan. 17, 1939 |